United States Patent [19]

Kiefer et al.

[11] 4,383,815
[45] May 17, 1983

[54] MOLDING TOOL

[75] Inventors: Günther Kiefer, Schwaigern; Dieter Rücker, Leingarten, both of Fed. Rep. of Germany

[73] Assignee: Adolf Illig Maschinenbau GmbH & Co., Heilbronn, Fed. Rep. of Germany

[21] Appl. No.: 348,155

[22] Filed: Feb. 11, 1982

[30] Foreign Application Priority Data

Mar. 12, 1981 [DE] Fed. Rep. of Germany ....... 3109415

[51] Int. Cl.³ .............................................. B29C 17/00
[52] U.S. Cl. .................. 425/387.1; 425/388; 425/405 R; 425/398
[58] Field of Search ............. 425/384, 387.1, 388, 425/398, 405

[56] References Cited

U.S. PATENT DOCUMENTS

| 3,173,174 | 3/1965 | Edwards | 425/387.1 X |
| 3,261,055 | 7/1966 | Dart | 425/405 X |
| 3,268,960 | 8/1966 | Morton | 425/405 X |
| 3,427,687 | 2/1969 | Miller | 425/388 X |
| 3,800,682 | 4/1974 | Gournelle | 425/384 |
| 4,105,736 | 8/1978 | Podovani | 425/398 X |

FOREIGN PATENT DOCUMENTS 2145250 3/1973 Fed. Rep. of Germany.

Primary Examiner—J. Howard Flint, Jr.
Attorney, Agent, or Firm—Spencer & Kaye

[57] ABSTRACT

A molding tool for making articles by deep-drawing a heated thermoplastic foil includes a matrix having an inner wall face defining an opening, a mold defining a mold cavity aligned with the opening, and a depressor movably received in the opening of the matrix for clamping marginal portions of the foil during molding operation. A heat conducting sleeve is immobilized in the opening and surrounds the depressor. The outer face of the sleeve and portions of the inner wall face of the matrix define an annular chamber which surrounds the sleeve. A seal is provided between the matrix and the sleeve for rendering the annular chamber fluid tight. Channels are provided in the matrix for introducing a coolant into the annular chamber.

12 Claims, 5 Drawing Figures

MOLDING TOOL

BACKGROUND OF THE INVENTION

This invention relates to a molding tool for manufacturing cup-shaped containers by deep-drawing a heated thermoplastic synthetic foil. The molding tool comprises an upper portion and a lower portion which are displaceable relative to one another. The lower portion constitutes the mold proper and is provided with a cutting edge. The upper portion includes a matrix and a spring-loaded depressor. A molding tool of the above-outlined type may be incorporated in the molding station of a thermoforming machine. The mode of operation of such a molding tool is conventional and is described, for example, in German Laid-Open Application (Offenlegungsschrift) No. 2,145,250.

For increasing the output of the molding tool it has been proposed to cool the depressor. Such a cooling may be effected by providing channels in the matrix and passing a coolant therethrough. Such a cooling, however, was not found to be thorough enough and resulted only in a slight output increase. According to another solution, as disclosed in United States patent application to Kiefer, Ser. No. 243,148, filed Mar. 12th, 1981, the depressor is exposed directly to a coolant flow. While such a solution has resulted in a substantial output increase, the provision of an appropriate seal between the coolant and the mold cavity has presented a significant problem. Since the seals are dynamically stressed in cycles of about 20 to 40 per minute, such seals wear relatively rapidly. A further factor which contributes to the wear of the seals is the fact that minute plastic particles present as a result of the stamping operation during the manufacturing process of the articles, may gain access to the clearance between the depressor and the matrix and thus contribute to the deterioration of the seal. Because of the limited space available, usually only O-rings or rings of quadratic cross section can be used; these are only conditionally adapted for dynamic stressing. Lip rings or similar, better adapted sealing elements have substantially greater dimensions and can therefore not be accommodated without introducing other disadvantages.

The immediate result of seal wear are leaks whereby coolant may gain access to the mold cavities. Such an occurrence is to be avoided at all cost, particularly taking into consideration the fact that the coolant often contains anti-corrosion additives and the articles to be manufactured are frequently intended for use as containers for foodstuff or as drinking cups.

SUMMARY OF THE INVENTION

It is an object of the invention to provide an improved molding tool of the above-outlined type in which the seal wear is reduced and wherein a comparable cooling effect may be achieved by using static seals.

This object and others to become apparent as the specification progresses, are accomplished by the invention, according to which, briefly stated, in each matrix opening there is accommodated a sleeve whose outer surface defines, with the inner face of the matrix wall, an annular chamber with which communicate channels for introducing and withdrawing the coolant. The depressor is arranged to slide in contact with the inner face of the thin sleeve wall whose outer face bounds the chamber in which the coolant flows.

In addition to improving the cooling for purposes set forth above, it is a further advantage of the invention that, since the depressor slides in the cooled sleeve and undergoes heat expansion during operation, it may engage the inner sleeve wall with a close fit. This results in a more thorough cooling than in case of a cold depressor and thus a larger gap. This means that the arrangement according to the invention has a regulating effect, whereby as the temperature increases, the cooling effect also increases and therefore the temperature of the depressor may be maintained constant within a narrow range. This has the beneficial result that uniform mold conditions and thus uniform products are ensured.

According to a further feature of the invention, particularly for the purpose of achieving a superior heat transfer between the sleeve and the depressor, the depressor is locally slotted on its circumference and thus is guided in the sleeve with a small bias.

DESCRIPTION OF THE PREFERRED EMBODIMENTS

Figure 2:
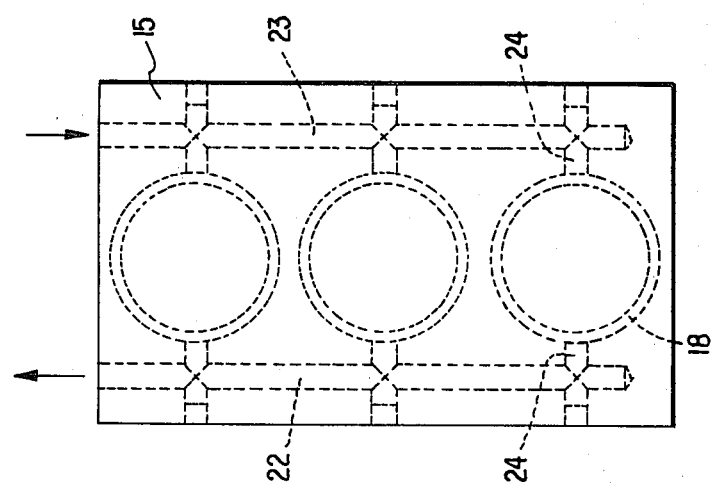
FIG. 2 is a top plan view of a component shown in FIG. 1.
Figure 1:
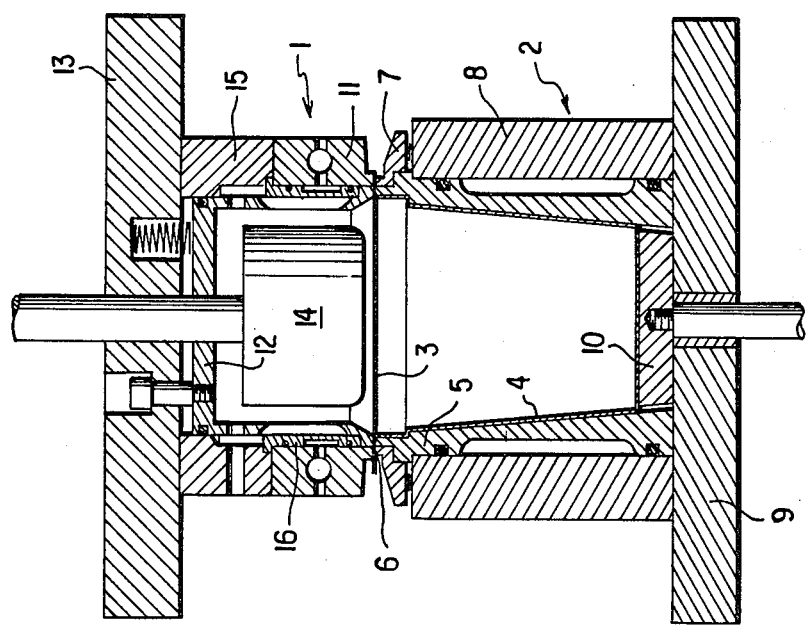
FIG. 1 is a sectional elevational view of a molding tool incorporating a preferred embodiment of the invention.

Turning now to FIG. 1, the molding tool shown therein comprises an upper portion 1 and a lower portion 2 which can be displaced relative to one another and which, in cooperation with one another, deep-draw a foil 3 to form a cup 4 and subsequently stamp the cup out of the foil. For this purpose the lower portion 2 comprises a mold insert 5 proper, provided with a cutting edge 6, a stripper 7, a support receptacle 8 and a base plate 9 as well as a height adjustable mold bottom 10 for each mold cavity. The upper portion 1 comprises a matrix 11, a depressor 12, a head plate 13 and an intermediate plate 15 as well as a stretching aid 14 for each mold cavity. The purpose of the depressor 12 is to immobilize (clamp) with its annular end face 26 marginal portions of the foil while the deep-drawing process is in progress, as may be observed in FIG. 1. As shown in FIG. 2, the molding tool comprises a plurality (for example three) of mold cavities arranged in one row. It is also feasible to provide multiple rows of mold cavities in a single molding tool.

The matrix 11 is provided with large openings (bores) 31, associated and in registry with each mold cavity. In each opening 31 there is arranged a sleeve 16 which at its end oriented towards the head plate 13 is provided with a shoulder 17 serving as a mounting flange. Each sleeve 16 is provided with a circumferentially extending depression 18 which forms an annular chamber with the inner face of the bore 31 of the matrix 11. The annular chamber 18 has an axial dimension which is significantly greater than its radial dimension. The sleeve 16 is provided adjacent both axial ends of the groove 18 with circumferential grooves 19 accommodating sealing rings 20. The depth (radial dimension) of the chamber 18 is so chosen that a relatively thin wall 21 remains along the radially inner face on which the depressor 12 may glide. It will be understood that the thinner the wall 21 the better the heat exchange and thus, the better the cooling effect.

Referring once again to FIG. 2, the matrix 11 is provided with longitudinal channels 22 and 23 as well as transverse channels 24 which maintain communication between the channels 22 and 23 on the one hand and the individual annular chambers 18 on the other hand. When coolant such as water is introduced into the channel 23 and removed from the channel 22 as shown by the arrows, a thorough flow of coolant will be ensured through the chambers 18 and thus a superior cooling of each sleeve 16 is achieved.

Figure 3:
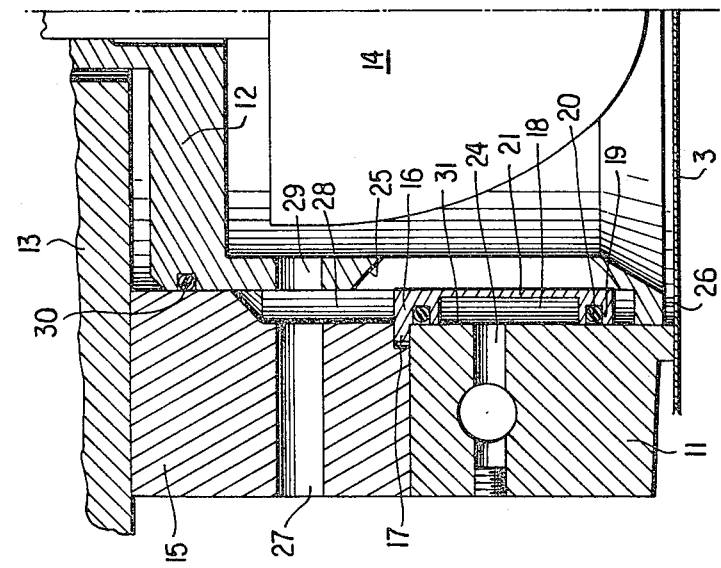
FIG. 3 is an enlarged sectional elevational view of a detail shown in FIG. 1.

As shown in FIG. 3, the depressor 12 is provided with circumferentially spaced, throughgoing, axially extending slots 25 which do not extend all the way to the lower end face of the depressor in order to avoid patterning of the articles. The slots 25 make it possible to cause the depressor 12 to slide with a slight radially outwardly oriented bias along the radially inner wall face of the sleeve 16 to thus achieve a particularly good heat transfer between the sleeve 16 and the depressor 12.

The openings 31 provided in the matrix 11 and serving to accommodate the sleeves 16 do not need extensions; this results in a particularly simple construction. The depressors 12 themselves may then have a structure which has no large stepped portions. The sleeves 16 are easy to manufacture since they are components which may be manufactured by a simple turning operation.

In the intermediate plate 15 there is provided a channel 27 for introducing compressed air into an annular chamber 28 wherefrom the air is admitted to the mold cavity through ports 29 provided in the depressor 12. The latter carries a circumferential ring seal 30 in its portion oriented towards the head plate 13.

Advantageously, the sleeves 16 and the depressors 12 are made of a superior heat conducting material which also has a low friction coefficient. For this purpose known copper-bronze alloys have been found to be particularly adapted.

Figure 4:
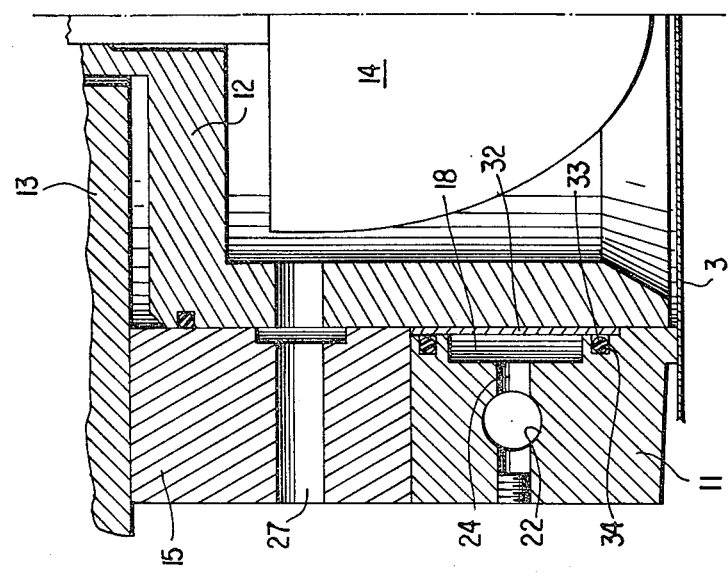
FIG. 4 is a sectional elevational view, similar to FIG. 3, showing another preferred embodiment of the invention.

While in the embodiment shown in FIGS. 1 and 3 the annular chamber 18 was essentially constituted by a depression formed in the sleeve 16, according to the embodiment shown in FIG. 4, such an annular chamber is formed by a depression 18a provided in the inner circumferential surface of the matrix 11. The depression 18a is closed by a thin-walled sleeve 32. O-rings 33 are provided in grooves 34 located adjacent both axial ends of the depression 18a.

Figure 5:
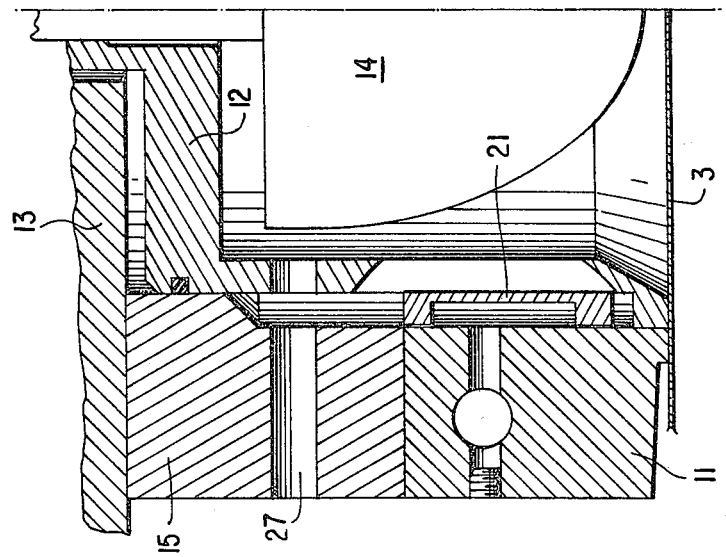
FIG. 5 is a sectional elevational view, similar to FIG. 3, showing another preferred embodiment of the invention.

Instead of clamping the respective sleeve 16 or 32 to the matrix 11 and using respective O-rings 20 and 34, it is feasible to sealingly bond the sleeves to the matrix. This solution, to be sure, makes replacement of the components more circumstantial (see FIG. 5)

It will be understood that the above description of the present invention is susceptible to various modifications, changes and adaptations and the same are intended to be comprehended within the meaning and range of equivalents of the appended claims.

What is claimed is:

1. In a molding tool for making articles by deep-drawing a heated thermoplastic foil, including a matrix having an inner wall face defining an opening, a mold defining a mold cavity aligned with said opening, and a depressor movably received in said opening of the matrix for clamping marginal portions of the foil during molding operation, the improvement comprising a heat conducting sleeve immobilized in said opening and surrounding said depressor; said sleeve having an inner face oriented towards said depressor and an outer face oriented towards said matrix; said outer face of said sleeve and portions of said inner wall face of said matrix defining an annular chamber surrounding said sleeve; sealing means provided between said matrix and said sleeve for rendering said annular chamber fluid tight; and channels provided in said matrix and communicating with said annular chamber for introducing a coolant thereinto.

2. A molding tool as defined in claim 1, wherein said sleeve is immobilized by being bonded to said matrix.

3. A molding tool as defined in claim 1, wherein said annular chamber is formed by a circumferential depression provided in said inner wall face of said matrix and said outer face of said sleeve; said outer face of said sleeve being cylindrical.

4. A molding tool as defined in claim 3, wherein said sealing means comprises circumferential grooves provided in said inner wall face of said matrix adjacent opposite ends of said depression and static seals received in respective said circumferential grooves; said static seals being in engagement with said outer face of said sleeve.

5. A molding tool as defined in claim 1, wherein said sleeve is of a material having a good heat conductivity.

6. A molding tool as defined in claim 5, wherein said depressor is of a material of good heat conductivity.

7. A molding tool as defined in claim 1, wherein said annular chamber is formed by a circumferential depression provided in said sleeve and a cylindrical portion of said inner wall face of said matrix.

8. A molding tool as defined in claim 7, wherein one end of said sleeve comprises a radial mounting shoulder.

9. A molding tool as defined in claim 7, wherein said sealing means comprises circumferential grooves provided in said sleeve adjacent opposite ends of said depression and static seals received in respective said circumferential grooves; said static seals being in engagement with said inner wall face of said matrix.

10. A molding tool as defined in claim 1, wherein said depressor has a sleeve-like shape and has a plurality of circumferentially distributed, axially parallel slots; said depressor being in slight face-to-face sliding engagement with said inner face of said sleeve.

11. A molding tool as defined in claim 10, wherein said depressor has a clamping face; said slots being spaced from said clamping face.

12. A molding tool as defined in claim 10, wherein said sleeve and said depressor are of a low-friction material.

* * * * *